US011621898B2

(12) United States Patent
Stanciu et al.

(10) Patent No.: US 11,621,898 B2
(45) Date of Patent: Apr. 4, 2023

(54) METHODS AND APPARATUS FOR ESTIMATING A TIME-OF-ARRIVAL OR A DISTANCE BETWEEN TWO DEVICE

(71) Applicant: NXP USA, Inc., Austin, TX (US)

(72) Inventors: Mihai-Ionut Stanciu, Bucharest (RO); Claudio Gustavo Rey, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/443,572

(22) Filed: Jul. 27, 2021

(65) Prior Publication Data

US 2022/0086068 A1 Mar. 17, 2022

(30) Foreign Application Priority Data

Sep. 11, 2020 (RO) ............... a 2020 00576

(51) Int. Cl.
*H04L 43/00* (2022.01)
*H04L 43/04* (2022.01)
*H04L 7/04* (2006.01)
*H04W 56/00* (2009.01)

(52) U.S. Cl.
CPC ............ *H04L 43/04* (2013.01); *H04L 7/042* (2013.01); *H04W 56/003* (2013.01)

(58) Field of Classification Search
CPC ...... H04L 43/04; H04L 7/042; H04W 56/003; H04W 56/008; G01S 11/02; G01S 5/14; G01S 5/0244; G01S 5/021; H04J 3/0697
See application file for complete search history.

(56) References Cited

U.S. PATENT DOCUMENTS

| 5,727,018 | A | * | 3/1998 | Wolf ............... H04B 1/708 375/150 |
| 6,128,331 | A | * | 10/2000 | Struhsaker ........ H04B 1/7095 375/150 |
| 7,298,806 | B1 | | 11/2007 | Varma et al. |
| 7,899,085 | B2 | | 3/2011 | Simmons |
| 7,916,797 | B2 | | 3/2011 | Yu et al. |
| 9,450,640 | B2 | | 9/2016 | McCulley et al. |
| 9,635,515 | B1 | | 4/2017 | Ahirwar |

(Continued)

FOREIGN PATENT DOCUMENTS

| EP | 1766837 B1 | 11/2009 |
| EP | 3315991 A1 | 5/2018 |

*Primary Examiner* — Jean B Corrielus (57) ABSTRACT

A method for estimating a time-of-arrival of a packet received by a receiver includes storing a reference bit-pattern and receiving a plurality of samples in a samples-buffer. In a bit-pattern detector, a matching group of samples having a bit-pattern which matches the reference bit-pattern is identified. In a correlator, a group of three correlation values is determined from the matching group of samples, including a local maximum correlation value, P0, an immediately preceding correlation value, Pm, and an immediately succeeding correlation value Pp. In an estimation unit, a polynomial function f(δ) of the difference, δ, between Pm and Pp is used to estimate a timing offset $T_{frac}$, between the local maximum correlation value and a correlation peak. The time-of-arrival is estimated from a time of the local maximum correlation value P0, and $T_{frac}$.

17 Claims, 7 Drawing Sheets

(56) References Cited

U.S. PATENT DOCUMENTS

| | | |
|---|---|---|
| 9,729,195 B2 | 8/2017 | Tamma et al. |
| 9,853,787 B2 | 12/2017 | Stanciu et al. |
| 2010/0260207 A1* | 10/2010 | Simmons ................ G01S 11/02 370/542 |
| 2010/0317358 A1 | 12/2010 | Sawamoto |

* cited by examiner

METHODS AND APPARATUS FOR ESTIMATING A TIME-OF-ARRIVAL OR A DISTANCE BETWEEN TWO DEVICE

CROSS-REFERENCE TO RELATED APPLICATIONS

This application claims the priority under 35 U.S.C. § 119 of Romania application no. A202000576, filed on 11 Sep. 2020, the contents of which are incorporated by reference herein.

FIELD

The present disclosure relates to distance estimation, between two devices. In particular it relates to determining the time of arrival of a signal transmitted from a transmitter to a receiver, and to providing a time-stamp for the arrival time at the receiver.

BACKGROUND

One way of localising a receiver such as a Bluetooth receiver, that is to say finding the distance between the receiver and another device which may also be similar a Bluetooth device operating as a transmitter, is by measuring the time of flight of a signal between the transmitter and the receiver. An accurate measurement of the time of arrival may be used to "timestamp" a received signal, such as a narrowband localisation packet according to a wireless protocol such as Bluetooth low energy (BLE).

Although protocols such as Bluetooth use a synchronous time-grid across multiple devices, the synchronisation is generally insufficiently precise for good localisation using a single time of flight. There are known techniques to account for synchronisation inaccuracy. One non-limiting example is to use round trip time, RTT, based localisation which is employed by, for instance, the Bluetooth HADM (high accuracy distance measurements) specification. According to this specification, BLE packets (called RTT packets) having a data rate of either 1 Mbps or 2 Mbps are transmitted between an initiator and a reflector, and other RTT packets are transmitted back. The RTT packets use pseudo random bit-patterns and as a result they are not guaranteed to have good autocorrelation properties. It is challenging to time-stamp the received signal with sufficient precision and accuracy for good localisation (for instance, of the order of 1 m).

SUMMARY

According to a first aspect of the present disclosure, there is provided a method of estimating a time-of-arrival of a packet received by a receiver, the method comprising: storing a reference bit-pattern; receiving a plurality of samples in a samples-buffer; identifying, in a bit-pattern detector, a matching group of samples having a bit-pattern which matches the reference bit-pattern; and determining, from the matching group of samples in a correlator, a group of three correlation values, comprising a local maximum correlation value, P0, an immediately preceding correlation value, Pm, and an immediately succeeding correlation value Pp; using a polynomial function $f(\delta)$ of the difference, $\delta$, between Pm and Pp to estimate, in an estimation unit, a timing offset $T_{frac}$, between the local maximum correlation value and a correlation peak; and estimating the time-of-arrival from a time of the local maximum correlation value P0, and $T_{frac}$.

Thus, by separating the function of detecting a rough match to the reference bit pattern and thereby a first estimate of a correlation time from accurate calculation of the exact correlation time, it may be possible to reduce the processing overhead on the system. In particular, the bit pattern detector may use a relatively low precision correlator which for example may use 6-bit arithmetic. In contrast the correlator may use a relatively high precision arithmetic such as 10 bit arithmetic. Although such high precision arithmetic is significantly more computationally intense, it may only be required to be performed once a bit pattern has been roughly matched.

In one or more embodiments, the polynomial function $f(\delta)$ is a cubic of the form: $f(\delta)=k_1 \cdot \delta + k_2 \cdot \delta^2 + k_3 \cdot \delta^3$ and the coefficients $k_1$, $k_2$ and $k_3$ are dependent on the reference bit-pattern.

In one or more embodiments the coefficients $k_1$, $k_2$ and $k_3$ are dependent on the reference bit-pattern by a vector, C, wherein $C=[cnt_{010}, cnt_{011}, cnt_{111}]$; wherein, applying an extended bit-pattern consisting of the reference bit-pattern both preceded and followed by a single bit of preselected polarity, $cnt_{010}$ is a number of bits in the extended bit-pattern having an opposite polarity to both its immediate neighbours, $cnt_{011}$ is a number of bits in the extended bit-pattern having an opposite polarity to just one of its immediate neighbours, and $cnt_{111}$ is a number of bits in the extended bit-pattern having an opposite polarity to neither of its immediate neighbours; wherein the coefficients relate to C through a transformation matrix $\Gamma$, having dimensions $(3 \cdot n) \times 3$ and defined through $$[k_1, k_2, k_3] = [cnt_{010}, cnt_{011}, cnt_{111}, cnt_{010}^2, cnt_{011}^2, cnt_{111}^2 \ldots cnt_{010}^n, cnt_{011}^n, cnt_{111}^n] * \Gamma$$

In one or more embodiments, N=3. The transformation matrix then has dimensions 9×3, with 27 elements. Such a size of matrix facilitates straightforward computation of $f(\delta)$.

In one or more embodiments, the method further comprises determining a time-stamp, $t_{TS}$, for the time-of-arrival from a reference time, $t_D$, of the bit-pattern detection, t0, a refinement $t_{P0}$ corresponding the difference between the reference time of the detected bit-pattern and the corresponding reference time of the local maximum correlation value, and $T_{frac}$, according to:

$$t_{TS} = t_D + t_{P0} + T_{frac}$$

An accurate timestamp can thereby be derived, which may enable localisation of one device such as an initiator relative to another device such as a reflector to within approximately 1 m.

In one or more embodiments, the method further comprises estimating a distance between the receiver and a transmitter from which the packet is received, based on the time-stamp.

In one or more embodiments, the received packet is modulated according to a Gaussian Frequency Shift Key, GFSK, modulation scheme. The bit-rate of the GFSK may be 1 MHz, and the received signal may be sampled at 4 MHz sampling rate, for instance, in embodiments in which the receiver is a Bluetooth receive, operating under a so-called HADM (high accuracy distance measurement) protocol. In other embodiments, the receiver may be operating under a different protocol, and/or the receiver may use a different sampling rate and/or a different modulation rate.

According to a second aspect of the present disclosure, there may be provided a time-stamp module for a transceiver and comprising: a samples buffer; a stored reference bit-pattern; a bit-pattern detector comprising a relatively low-precision correlator, configured to identify a set of samples having a bit-pattern which matches the reference bit-pattern; a relatively high-precision correlator configured to determine, from the set of samples, a group of three correlation values, comprising a local maximum correlation value, P0, an immediately preceding correlation value, Pm, and an immediately succeeding correlation value Pp, and an estimation unit configured to use a polynomial function f($\delta$) of the difference, $\delta$, between Pm and Pp to estimate a timing offset between a timing of the local maximum correlation value and a correlation peak, and P0, Pm, and Pm.

In one or more embodiments, the polynomial function f($\delta$) is a cubic of the form:

$$f(\delta)=k_1 \cdot \delta + k_2 \cdot \delta^2 k_3 \cdot \delta^3$$

and the coefficients $k_1$, $k_2$ and $k_3$ are dependent on the reference bit-pattern. In one or more embodiments, the coefficients $k_1$, $k_2$ and $k_3$ are dependent on the reference bit-pattern by a vector, C, wherein C=[$cnt_{010}$, $cnt_{011}$, $cnt_{111}$], wherein, applying an extended bit-pattern consisting of the reference bit-pattern both preceded and followed by a single bit of preselected polarity, $cnt_{010}$ is a number of bits in the extended bit-pattern having an opposite polarity to both its immediate neighbours, $cnt_{011}$ is a number of bits in the extended bit-pattern having an opposite polarity to just one of its immediate neighbours, and $cnt_{111}$ is a number of bits in the extended bit-pattern having an opposite polarity to neither of its immediate neighbours; wherein the coefficients relate to C through a transformation matrix $\Gamma$, having dimensions (3·n)×3 and defined through $$[k_1,k_2,k_3]=[cnt_{010}, cnt_{011}, cnt_{111}, cnt_{010}^2, cnt_{011}^2, cnt_{111}^2 \ldots cnt_{010}^n, cnt_{011}^n, cnt_{111}^n]*\Gamma$$

In one or more embodiments, the time-stamp module is further configured to estimate a distance between the receiver and a transmitter from which the packet is received, based on the time-offset, a local time of the local maximum correlation value, and a process time.

According to a third aspect of the present disclosure, there is provided a transceiver comprising a time-stamp module as just described, a Gaussian Frequency Shift Key, GFSK, modulator and a GFSK demodulator. The transceiver may be a Bluetooth transceiver. The skilled person will appreciate that the methods and apparatus described hereinunder are not limited to Bluetooth devices and Bluetooth transmission protocol, but may be equally applicable to other devices or transmission protocols, in which autocorrelation of a modulated pseudo-random bit-pattern can be applied for localisation.

Furthermore, there may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a computer readable medium, which may be a physical computer readable medium, such as a disc or a memory device, or may be embodied as another non-transient signal.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments.

DETAILED DESCRIPTION OF EMBODIMENTS

Figure 1:
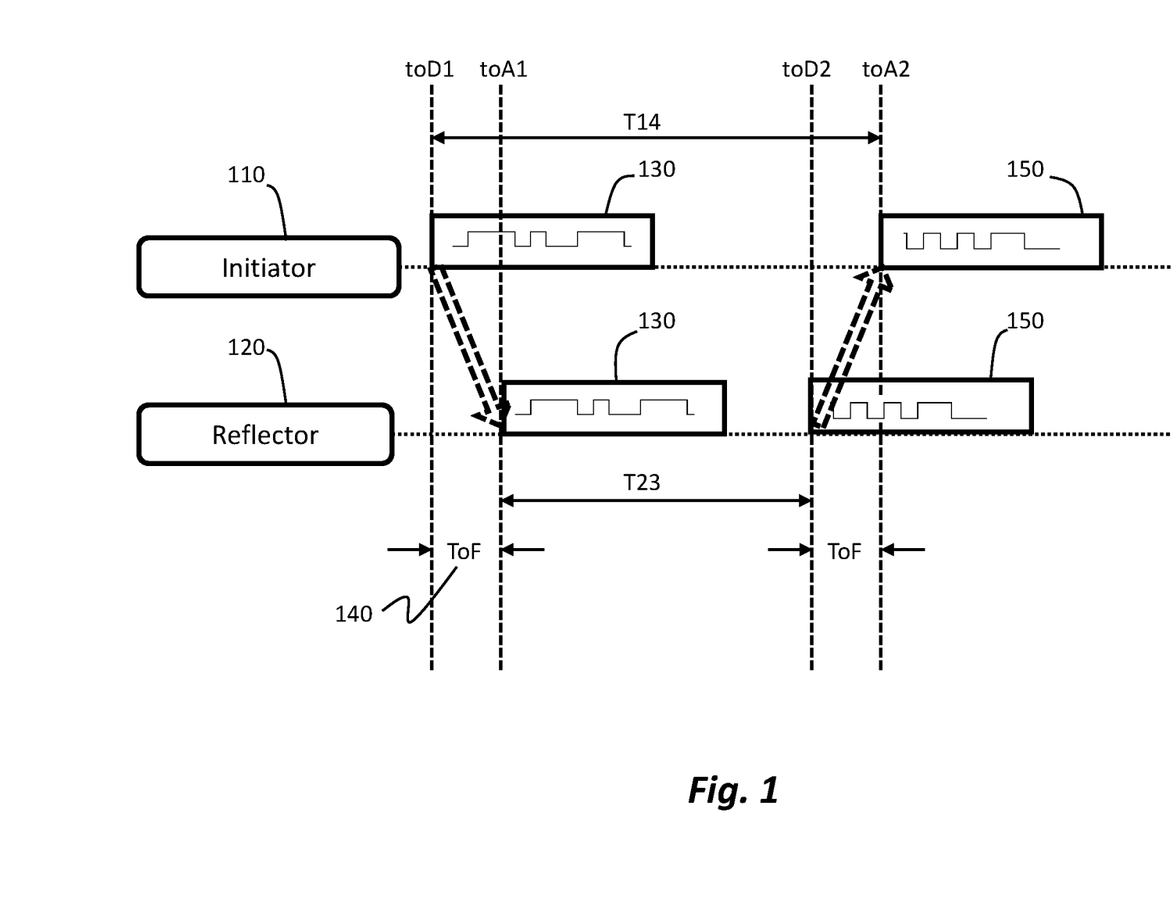
FIG. 1 illustrates the concept of RTT for localization.

FIG. 1 shows in more detail the concept of RTT ranging as applied, for instance, in Bluetooth protocols.

The figure shows two devices 110 and 120, which are conventionally termed the initiator and the reflector respectively. The initiator transmits a packet comprising first known bit-pattern 130 to the reflector at a given instant, the time of departure toD1. After a flight duration ToF, this packet is received at the reflector, at another given instant, that is the first time of arrival toA1. In passing it is noted that as used herein, a "time" denoted by (lower-case) t refers to an instant or moment in time, and a time referred to by (uppercase) T refers to a duration or length of time. In response, after a period T23 (hereinafter the "reflector turn-round duration"), the reflector transmits another packet comprising a second known bit-pattern 150 to the initiator at a given instant—the time of departure toD2. After another flight duration ToF (which is, for static devices, the same as the first flight duration in the opposite direction) this packet is received at the initiator, at another given instant, the second time of arrival toA2. Of course, it takes a finite time to transmit (or receive) a packet, so references to a "given instant" refer to a specific reference point, such as the start or end of the packet transmission.

The total duration for this process, T14, is then given by:

$$T14 = ToF + T23 + ToF. \quad (1)$$

$$\text{But } T23 = (toD2 - toA1), \quad (2)$$

$$T14 = (toA2 - toD1) \quad (3)$$

and the round trip time $RTT=2ToF$:

$$So\ RTT=2ToF=(toA2-toD1)-(toD2-toA1) \quad (4)$$

As a result, if the reflector turn-round duration T23 is known, the time of flight—and thus the distance between the two devices—can be calculated from the interval T14. Thus accurate measurements of the time of arrival ToA2 by the initiator 110 is important.

It is noteworthy that the two time intervals T14 (=(toA2−toD1) and T23 (toD2−toA1), are each local to a single device that is to say do not depend on accurate synchronisation of the separate clocks across the 2 devices.

Considering just one of the devices—that is to say the initiator, accurate measurement of the moment toD1 is straightforward; however, sufficiently accurate measurement of the arrival time toA2 is harder: this time stamp is provided according to embodiments of the present disclosure by an accurate correlation, following by processor-efficient post-processing to interpolate between the correlation measurements.

It should also be mentioned at this point, that the bit-patterns are known a priori by both devices, as they are created using random generators with the seed which is shared by both devices through a negotiation step prior to the RTT transmissions.

Figure 2A:
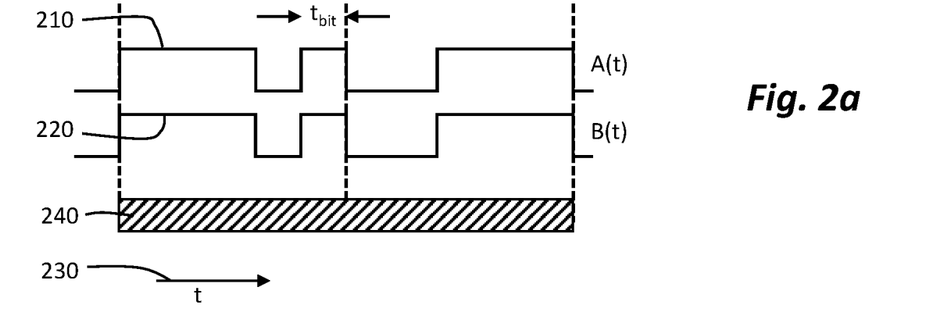
FIG. 2a illustrates the principle of autocorrelation with a perfectly matched sample.

FIG. 2 illustrates schematically, the principle of autocorrelation. Considering first FIG. 2a, this shows two copies, A(t) and B(t) of a binary, digital signal at 210 and 220 respectively. As shown, the signals overlap exactly along the time axis (shown schematically by the arrow t, 230). The signals may be described as being perfectly correlated. Since correlation is usually measured between "0" and "1" the two signals may be considered to have a correlation value of 1. This is shown schematically by the area of the shape 240, which may be represented as the integral of 'A(t)*B(t)' over the duration of the signal.

Figure 2B:
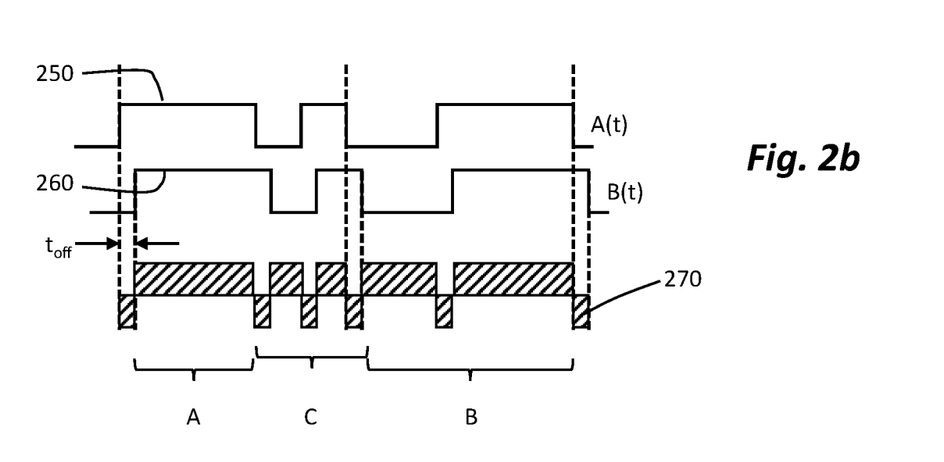
FIG. 2b illustrate the principle of autocorrelation with an imperfectly match sample.

In contrast, considering now FIG. 2b, this shows of, once again, two copies of a binary digital signal 250 and 260. However, in this case one signal is slightly offset in time with respect to the other signal. As shown, the offset $t_{off}$ may be less than the duration of a single bit, $t_b$, although the skilled person will appreciate that in other situations the offset may be more than the duration of one bit. In this case, the shape illustrating the correlation is composite: during moments when the first and second signal have the same value, the integral is positive; conversely during moments when the first and second signal have opposite values, the integral is negative. The overall correlation is related to the difference between the "amount of positive" and the "amount of negative"—in this case the correlation value is approximately 0.7.

FIG. 2 has been described in the context of "bits", which generally relates to the base unit of data. Also used in this disclosure is the term "symbol". The skilled person will appreciate that "symbol" may also refer to a base unit of data but depending on the modulation scheme used, a single bit of data may be "smeared out" across more than one symbol. For instance, in Gaussian Frequency Shift Key modulation (GFSK), a low pass filter is applied to smooth the edges of each transition in order to limit the high frequency harmonics or overtones in transmission. A by-product of this is that the information from a single bit is no longer localised or limited to a single sample.

FIG. 2b in particular illustrates two principles which the present inventors have appreciated are particularly pertinent for the present disclosure. Firstly, as will be known to the skilled person, the degree of correlation falls as the two signals are more spaced apart in time.

And secondly during periods when the binary signal is frequently transitioning between high and low state—such as is shown in the central region C of FIG. 2b—the numerical value of correlation is much lower than the correlation over parts of the signal where there are fewer transitions between high and low—such as is shown over parts A and B of the signal shown in FIG. 2b. In other words, since, for two signal which are offset by only a fraction of a bit in which there are relatively many transitions between high and low and vice versa, the correlation falls away from perfect correlation (with numerical value 1) faster as the two signals become offset, than is the case for a signal in which there are fewer transitions between high to low.

Figure 3:
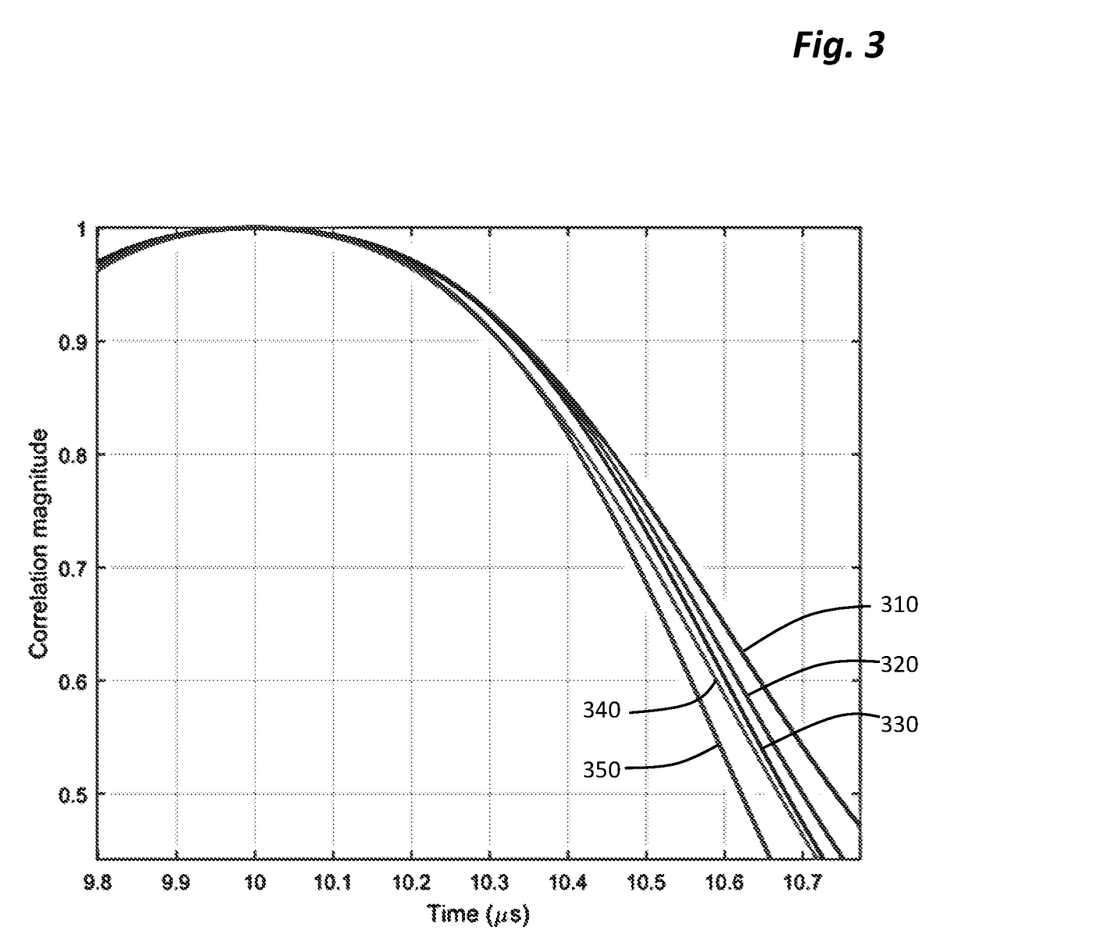
FIG. 3 illustrates the fall-off of correlation between two copies of bit-pattern as the offset between them increases.

This second principle is illustrated in FIG. 3. FIG. 3 shows the right hand side of each of a set of curves which are all centred around a particular moment in time (shown as 10.0 on the abscissa or x-axis which shows time in microseconds), corresponding to the drop in correlation value as two (identical) signals are moved further apart in time, for various signals 310, 330, 320, 340 and 350 which have different amounts of "transitioning" being high and low. As can be seen, not only is the falloff of correlation steeper for some signals than others, but the shape of the curve can also vary.

Figure 4:
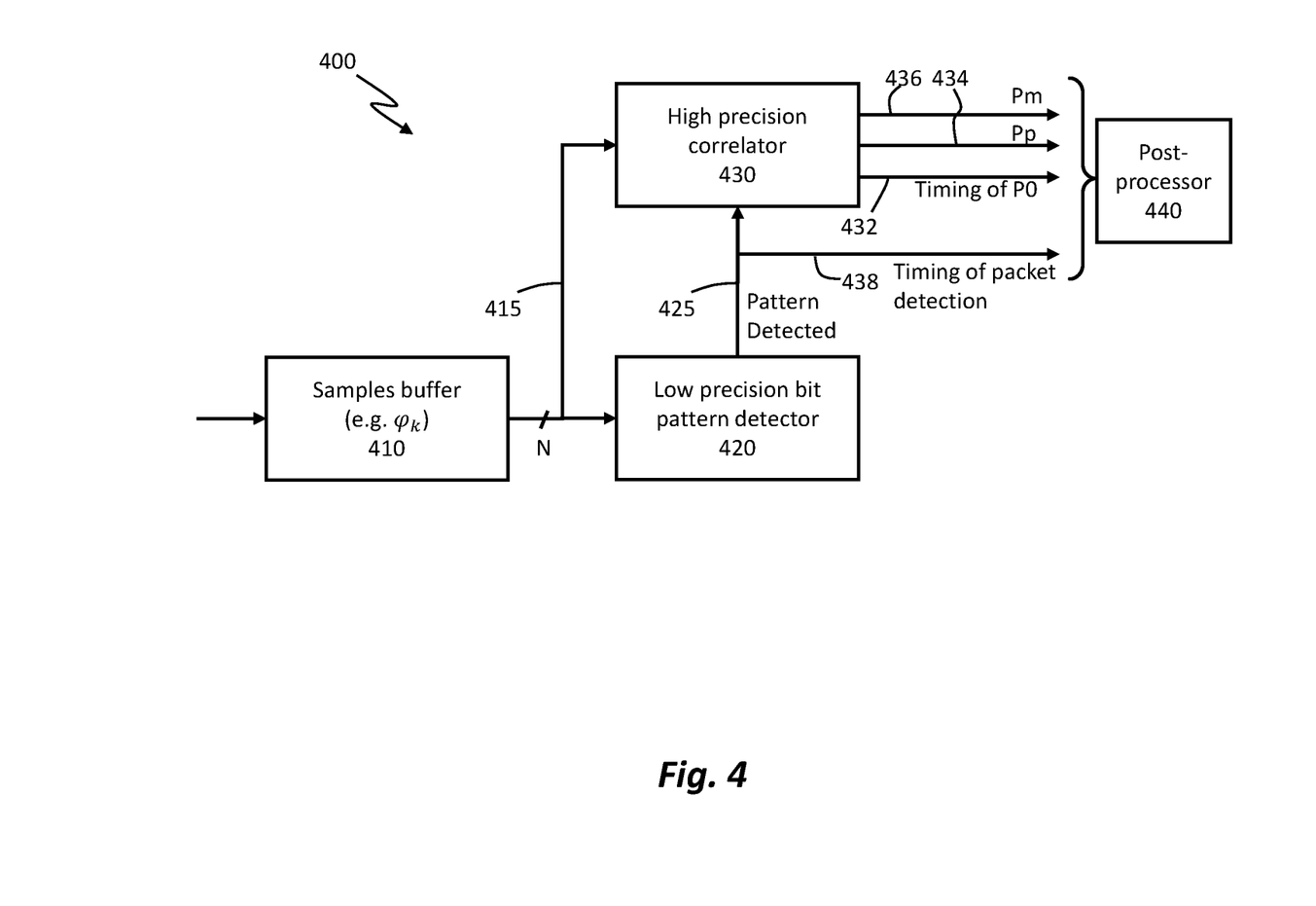
FIG. 4 shows, schematically, apparatus according to embodiments of the present disclosure.

To illustrate how this principle has been used to advantage by the present inventors, a generic method for time stamping of a BLE signal having a RTT packet with a bit frequency of 1 MHz and four times over-sampling rate sampling of 4 MHz will now be described. It should be appreciated that the rates are examples only, and the present disclosure is not limited thereto. It will also be appreciated by the person skilled in the field of Bluetooth, that in this instance demodulation of bits from a carrier frequency to the sampling frequency is carried out in the complex domain to result in two values (I and Q responding to the real, and imaginary or quadrature, values) for each bit $b_k$ The method is illustrated in FIG. 4, which shows an apparatus 400 for estimating a time-of-arrival of a packet received by a receiver (which may be, in the present context, either an initiator or a reflector).

In summary, a plurality (or stream) of samples are received in a samples-buffer 410. The samples in the sample-buffer are FM demodulated samples, which are stored, for example, as 8-bit precision digital values. A bit-pattern detector, which may be a relatively low-precision bit-pattern detector, 420 compares groups of samples to the reference bit-pattern and identifies a group of samples which matches the reference bit-pattern. This group of samples is further processed in a relatively high-precision correlator 430, to identify a set of three correlation values, comprising a local maximum correlation value, P0, 432, an immediately succeeding correlation value (or "plus 1"), Pp 434, and an immediately preceding (or "minus 1") correlation value Pm 436. The set of data, comprising P0, Pm, Pp and the timing 438 of the packet detection, is post-processed in a postprocessor 440, using a function f($\delta$) of the difference, $\delta$, between Pm and Pp. The post-processing estimates, in an estimation unit, a timing offset $T_{frac}$, between the local maximum correlation value P0, and a correlation peak using Pm and Pp, as will be described in more detail hereinbelow.

In more detail, the bit-pattern detector 420, may be the bit-pattern detector used for communication. Typically, this comprises a correlator which has relatively low precision, for example it may require 6 bits for each of the I and Q values. Demodulation is done (for each of the real and imaginary parts of each bit), according to:

$$b_k = \begin{cases} 0 & \text{if } \varphi_k < 0 \\ 1 & \text{if } \varphi_k \geq 0 \end{cases}, \quad (5)$$

where $\varphi_k$ is the FM demodulated waveform (i.e. the differentiation of the phase of the received waveform).

The reference bit-pattern is also differentiated, to derive $\text{ref}_k$ and the bit-pattern detection consists of a correlation in the complex domain:

$$C[k] = |\Sigma_{i=0}^{N-1} \exp(j^*(\varphi_{k-i} - \text{ref}_k))|^2, \quad (6)$$

where C[k] is the correlation magnitude, and N is the number of samples used in the correlation: typically, N=32, although the skilled person will appreciate that other values of N are also possible. Thus, the real and imaginary parts of the "$\exp(1j^*(\varphi_{k-i} - \text{ref}_k))$" factors are 6-bit encoded for this low resolution correlator.

Then "P0" corresponds to $k_{max}$, which is the sampled time instant at which C[k] is maximum, "Pm" corresponds to $k_{max}-1$ and "Pp" corresponds to $k_{max}+1$. Since the bit-pattern detector has relatively low precision (for instance, it might be 6-bit, as mention above), it does not require substantial computing power, and can be continuously operated.

However, the precision in time (and corresponding spatial precision through the speed of the electromagnetic propagation, c, ~3×10^8 ms$^{-1}$), of a 6-bit signal is inadequate for the purpose of localisation, since 1 m is equivalent to a 3.3 ns timing estimation error: for a Bluetooth signal with 1 MHz modulation, each "bit" corresponds to 300 m. So 6-bit precision then "corresponds" to 300/64 m, or 4.5 m. in contrast, increasing the precision to 10-bits result in a hypothetical "spatial" accuracy of 300/1024 m—that is to say, approximately 29 cm. The term "hypothetical" has been used in this discussion, since an accuracy of 29 cm is not achievable a practice due to both noise, and information theory (Nyquist) limitations. However, the above discussion makes clear that to achieve a timing accuracy sufficient to allow for localisation to 1 m or better, a relatively high precision (for instance at least 9 bit) signal must be used in calculations. According to embodiments of the present disclosure, this high-precision calculation is only performed once an appropriate bit-pattern has been recognised, thereby reducing the overall processing requirements.

Once a bit-pattern corresponding to the reference bit-pattern has been detected in the bit-pattern detector 420, this information (in particular the value $k_{max}$) is transferred as shown at 425 to the relatively high precision correlator 430.

The high precision correlator 130 then reuses the relevant group of samples, which as mentioned above may be 32 in number, from the sample buffer to find, with greater accuracy, the three correlation magnitudes, P0, Pm. and Pp, corresponding to values of k being $k_{max}$, $k_{max}-1$, and $k_{max}+1$.

The correlation equation is the same as in the relatively low precision bit-pattern detector 420:

$$C[k] = |\Sigma_{i=0}^{N-1} \exp(1j^*(\varphi_{k-i} - \text{ref}_k))|^2, \quad (6')$$

although the precision of each of the exponential terms is now increased to 10 bits.

Of course, it will be appreciated that the estimate of the position of the max ($k_{max}$) provided by the bit pattern detector may not have been correct. In particular the increased accuracy provided by the high resolution correlator may result in the maximum correlation being for a different value of k. In general, though, it will be the case that $k_{max}$ identified by the high precision correlator will be within +/−1 of that identified by the bit pattern detector.

The correlator 430 provides accurate values for P0, Pm and Pp, and these are then used, along with the timing of the local maximum correlation value P0, to find the timing of the true peak of the correlation curve. This is illustrated in FIG. 5.

Figure 5:
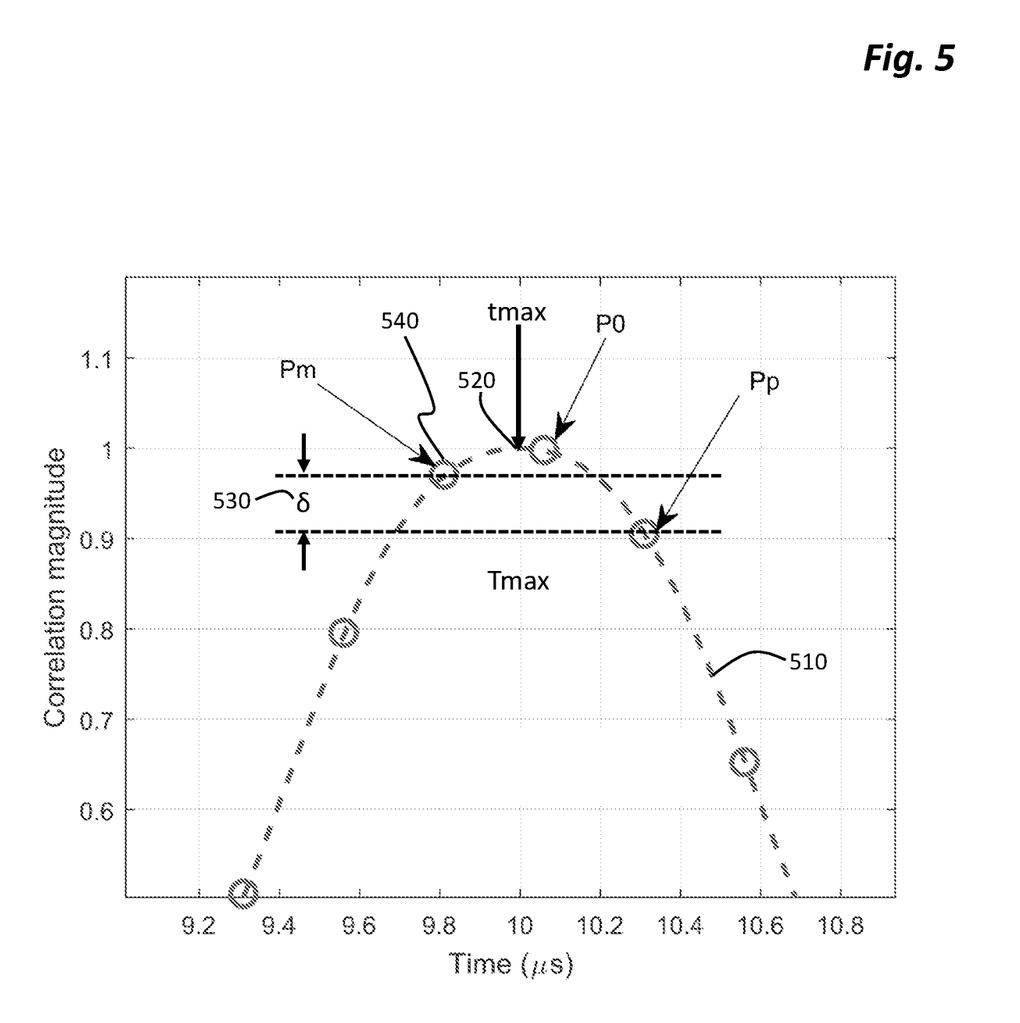
FIG. 5 shows continuous and discrete time correlation.

In FIG. 5, a simulated correlation magnitude 510 on the y-axis or coordinate, is plotted against time, in μs, on the x-axis or abscissa. As discussed above, the correlation curve is symmetrical about a local true maximum tmax 520, which in this illustrative case is set at a notional time of 10 μs. A local maximum correlation value P0 is shown on the curve. In this illustrative example, P0 is close to the maximum, but offset in time by approximately 0.05 μs (that is to say, 50 ns). As mentioned above, for a typical Bluetooth low energy implementation, the bit rate is 1 MHz and this is sampling is at four times over-sampling, resulting in a sample being taken every 250 ns. So, also shown on the figure are 5 additional discrete time correlation sampling moments and the value of P resulting at each of these. Naturally they fall on the simulated continuous correlation curve 510. In particular the immediately preceding sample point Pm and immediately following sample point Pp are also shown.

However, as mentioned above, the value of $k_{max}$ identified by the low precision bit pattern detector 420 may not have been correct. For the sake of example let us assume that the bit detector 420 identified the point 540 (shown in FIG. 5 is Pm) as being the local maximum. The high resolution correlator identifies that this original estimate is "off by one", and that the highest correlation value is found in the next sample.

The timing of P0 provides a first estimate of the true moment of local maximum tmax; however, this moment may be adjusted, to determine the correct tmax using curve fitting. According to embodiments of the present invention, the values of Pm and Pp are used along with P0 to estimate tmax. Put briefly, if Pm is greater than Pp, tmax is earlier than— that is, to the left of— P0, and if Pm is less than Pp, tmax is later than— that is, to the right of— P0. And the difference between Pm and Pp, δ=(Pm Pp), 530, provides an indication of how large the shift to the left or right should be.

Put another way, the time stamp $t_{TS}$ of the signal may be defined through the original detection timing $t_D$ identified by the low precision bit pattern detector, together with the any required integer timing correction $t_{P0}$ to provide the true local maximum correlation value, and a function f of δ to provide a fraction timing correction:

$$t_{TS} = t_D + t_{P0} + f(\delta) \quad (7)$$

In the case of a 4 MHz sampling rate, the value of $t_{P0}$ will generally be either 0 (in the case that the correlation estimate by the low precision bit pattern detector was correct) or +/−250 ns corresponding to a single sample refinement. In the example mentioned above, where the bit pattern detector inaccurately identifies the sample 540 as the local maximum, $t_{P0}$=+250 ns. In other words, $t_{P0}$ represents an adjustment to the original estimate of the timing of the correlation maximum (which is provided by the bit-pattern detector or low-precision correlator), in steps of a single sample (or an integer timing step)—which in this case of 4 MHz sampling rate corresponds to 250 ns.

The function f(δ) may be approximated through a polynomial expansion. Although polynomials of other (higher, or even lower) order may be used, the inventors have found that a good balance between computational complexity and accuracy is achieved by using a cubic polynomial:

$$f(\delta)=k_1\delta+k_2\delta^2+k_3\delta^3 \qquad (8)$$

However, as discussed above, the shape of the correlation curve, and thus f(δ) is heavily dependent on the bit-pattern itself. Every possible bit-pattern has an associated shape, so a naïve approach would be to fit the polynomial coefficients $k_1$, $k_2$ and $k_3$ for each possible bit-pattern and store them in the memory. However, this would require storing 2^32=4, 300,000 separate values, which is clearly unrealistic. Thus, according to one or more embodiments of the present disclosure, a proxy is used for the curve fitting.

Returning for the moment, to discussion of FIGS. 2a and 2b, the present inventors have appreciated that the correlation curve may be classified according to a parameter which we may define as its "bumpiness": that is to say the frequency with which adjacent bits transition from high to low or vice versa. A bit-pattern with a high bumpiness would have many transitions across adjacent bits, and one with low bumpiness would have relatively few transitions—and thus extended sequences of "1 s" or "0s". The inventors have appreciated that the bumpiness of the bit-pattern is directly related to the shape of the correlation curve: as a thought experiment only, consider a bit-pattern for which all the bits are the same (thus with zero bumpiness). Irrespective of the offset between the bit-pattern and the copy, the correlation would remain very high—and in the theoretical limit, for an infinite length bit-pattern the correlation would remain completely flat with a value 1. This is the limit for an extremely shallow correlation curve. Conversely, if the bit-pattern consists entirely of alternating ones "1 s" "0s", the correlation would fall to 0 as the offset between the bit-pattern and its copy reaches one half-bit and would be completely anti-correlated (with a correlation magnitude back at 1) for an offset of a single bit—this is the limit for a steep fall-off of the correlation curve.

In order to quantify this concept and apply it, a third-order vector C is defined, where $$C=[cnt_{010},cnt_{011},cnt_{111}], \qquad (9)$$

The components $cnt_{010}$, $cnt_{011}$, $cnt_{111}$ relate to the bumpiness of the bit-pattern, and are defined as follows:

$cnt_{010}$ is a number of bits in the extended bit-pattern having an opposite polarity to both its immediate neighbours, $cnt_{011}$ is a number of bits in the extended bit-pattern having an opposite polarity to one, and only one, of its immediate neighbours, and $cnt_{111}$ is a number of bits in the extended bit-pattern having an opposite polarity to neither of its immediate neighbours;

where an "extended" bit-pattern is a bit-pattern with two additional bits: a "prior" bit and a "posterior" bit, each of which have been assigned a preselected value. Thus high values of $cnt_{010}$ and more particularly $cnt_{011}$ correspond to a high bumpiness, and high values of $cnt_{111}$ correspond to a low bumpiness.

Figure 6:
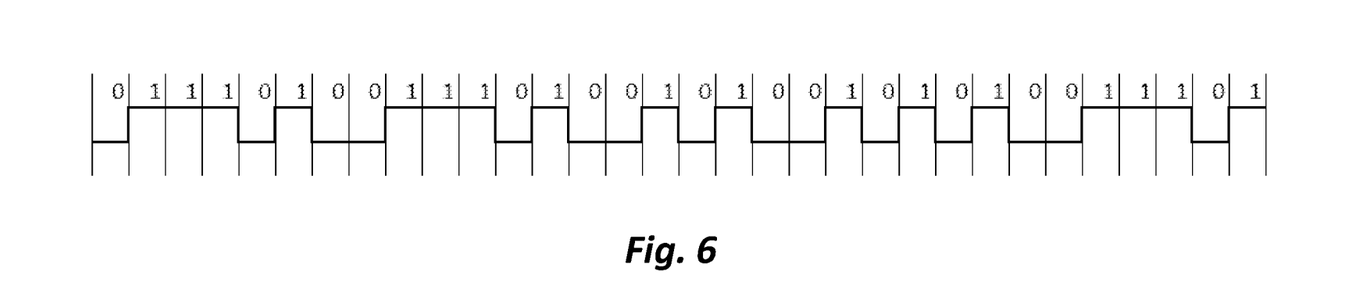
FIG. 6 shows an example 32-bit bit-pattern.
Figure 7:
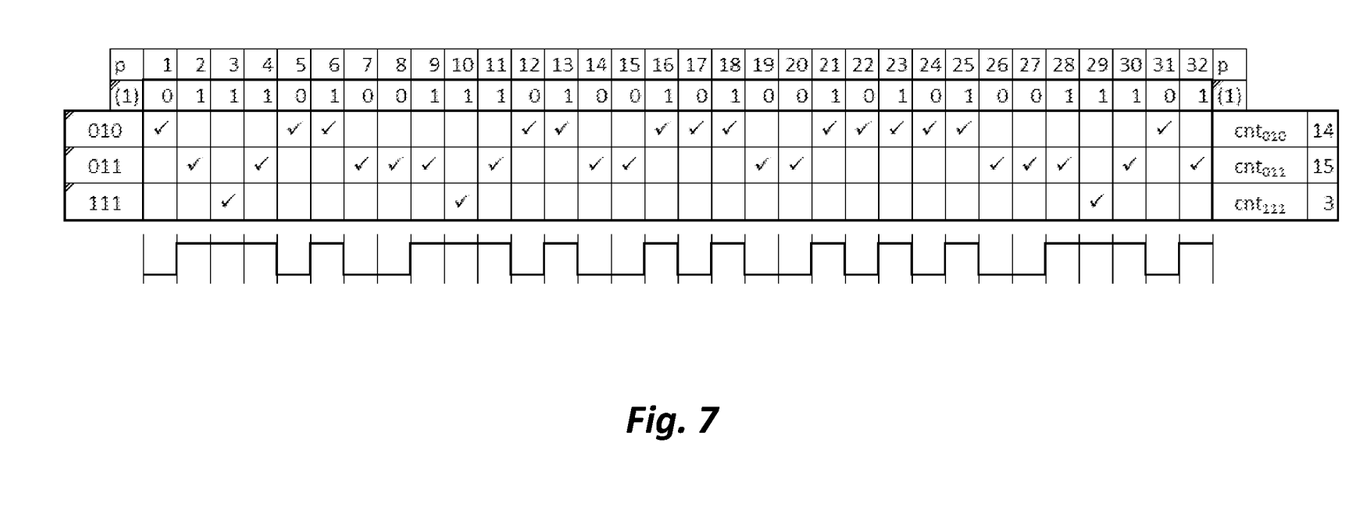
FIG. 7 illustrates a proxy to assess the bumpiness of the bit-pattern of FIG. 6 according to one or more embodiments.

The concept of bumpiness, and the vector C, is illustrated in FIGS. 6 and 7. FIG. 6 shows an illustrative example of a 32-bit bit-pattern both in binary ("1s" and "0s") form and in graphical ("high" and "low") form. This particular bit-pattern has been chosen arbitrarily in order to illustrate the principle. The same bit-pattern is replicated, along with the ordinal number of each bit, along the top two rows of FIG. 7. However, in FIG. 7, the bit-pattern has been extended with both a prior bit and a posterior bit, each of which have been assigned a preselected value ("1") in this instance.

The lower three rows of the table in FIG. 7 show the contribution that each bit makes to the value of one, and only one, of the three components of C, that is $cnt_{010}$, $cnt_{011}$, or $cnt_{111}$. In this example, there are 14 bits which have opposite polarity to both of its immediate neighbours, 15 bits which have opposite polarity to one, and only one, of its immediate neighbours, and three bits which have the same polarity of both of its immediate neighbours. So in this instance C=[14, 15, 3]

In passing, it is noted that for present purposes, in particular situations in which the offset between a bit-pattern and the reference bit-pattern is only a fraction of a single bit, the relationship of a bit to its immediate neighbours is sufficient, and more distance relationships need not be taken into account. Moreover, it has been experimentally verified that different bit-patterns having the same vector C exhibit the same correlation curve.

Returning now to the curve fitting problem, it has already been mentioned that so a to fitting the polynomial coefficients $k_1$, $k_2$ and $k_3$ for each possible bit-pattern and store them in the memory would be a computational impracticable and naïve approach. The problem has now been reduced, though, to the vector C. Nonetheless, C can take 32×31×30 over 29,000 values, and storing all possible values vector C would be onerous.

According to one or more embodiments of the present disclosure, the task is further simplified: in particular, the coefficients $k_1$, $k_2$ and $k_3$ can be related to C through the following relationship:

$$[k_1,k_2,k_3]=[cnt_{010},cnt_{011},cnt_{111},cnt_{010}^2,cnt_{011}^2,cnt_{111}^2\ldots cnt_{010}^n,cnt_{011}^n,cnt_{111}^n]*\Gamma \qquad (10),$$

where Γ is a transformation matrix, having dimensions (3·n)×3.

Experimentally, it has been found that choosing n to have value 3 provides a good balance between computational complexity and accuracy. In that case $$[k_1,k_2,k_3]=[cnt_{010},cnt_{011},cnt_{111},cnt_{010}^2,cnt_{011}^2,cnt_{111}^2, cnt_{010}^3,cnt_{011}^3,cnt_{111}^3]*\Gamma \qquad (11)$$

and Γ is a transformation matrix having dimensions 9×3. Once the 27 elements of Γ have been calculated and stored, it is a relatively simple arithmetic exercise to compute [$k_1$, $k_2$, $k_3$], and thus the offset adjustment f(δ) which is to be applied to $t_{p0}$. The 27 elements of Γ can be computed by fitting a large amount of simulated or measured data onto the model, and thus is done before the apparatus is used.

The skilled person will appreciate that, for any given length L of the bit-pattern, the three parameters $cnt_{010}$, $cnt_{011}$, $cnt_{111}$ are not completely independent, but related through:

$$cnt_{010}+cnt_{011}+cnt_{111}=L \qquad (12).$$

As a result, the three values do not have to be calculated independently, but rather, only two need to be counted and the third can be computed from the above equation.

This should reduce C to having (almost) only 2 degrees of freedom, and it might have been considered that the method described above could be further simplified, by normalising to $cnt_{111}$, resulting in:

$$C'=[cnt_{010}/cnt_{111},cnt_{011}/cnt_{111},1]$$

or $C''=[r_1,r_2]$. $\qquad (13).$

However, it has been determined experimentally that reducing C to a 2D vector produces unexpected results in certain situations, and is thus not a preferred embodiment. This occurs in particular where either (a) cnt111 is very small—with the particular case when it is 0—(in which case the elements of the C" become too large and too close to one another); or (b) cnt111 is too large making the elements of the C" become too small. In preferred embodiments therefore, C is fully defined using the 3D vector.

Figure 8:
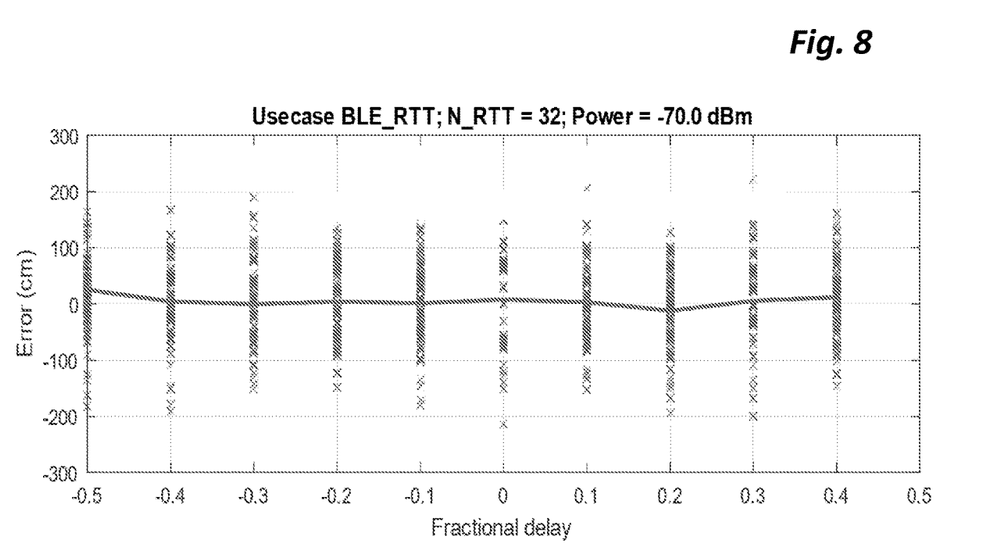
FIG. 8 shows the impact of many measurements to determine a transformation matrix.

FIG. 8 illustrates performance simulations for a 32-bit bit-pattern, under a BLE round-trip time use case in which the bit rate is Gaussian FSK modulated having a 1 Mpbs transmission rate, modulation depth h of 0.5 and an impulse response with a BT of 0.5. The transformation matrix, which depends both on the modulation parameters (BT and h), and on the response of the receiver front-end, has been pre-calculated. Bit-patterns were randomly generated and applied to a fixed-point implementation of the high accuracy correlator 430. "Fixed-point", here, applies both in terms of fixed-point data representation and fixed-point arithmetic computations. The skilled person will appreciate that such a fixed-point architecture introduces digital quantisation noise into the data. An analogue SNR of 25 dB was also introduced.

The figure shows many individual (simulated) local maximum value correlations 810, 820, obtained in the following manner: a fractional delay (true $\delta$) is imposed onto the received signal, with respect to the local sampling clock. The fractional delay is expressed in sample units (so the range is [−0.5*1 sample, +0.5*1 sample]). In the case of BLE-1 Mbps the sampling period is 250 nanoseconds, so the fractional delay is a fraction of this value.

For each fractional delay imposed on the received signal there are several distance estimates, plotted with "x" on the graph. Each distance is as accurate as the estimation of the imposed $\delta$). The continuous line 830 represents the average of the "x" points for each imposed fractional delay, that is to say, an average distant measurement error, in dependence on the actual fractional delay.

Figure 9:
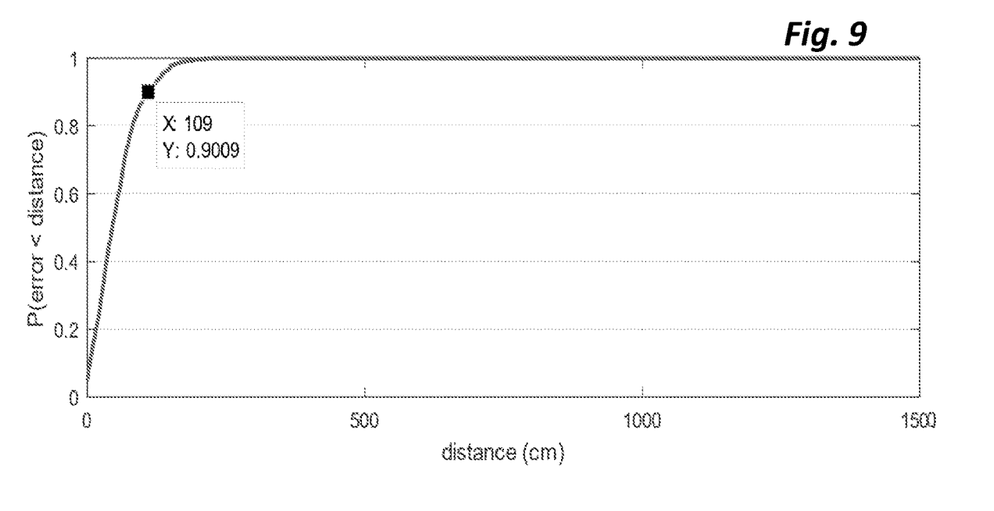
FIG. 9 illustrates simulated localisation calculations according to one or more embodiments.

FIG. 9 shows a cumulative distribution curve for instantaneous distance measurement error for the multiple simulations made and shown in FIG. 8. It can be seen that a measurement accuracy of 109 cm of vector is achieved with a probability of 90%.

From reading the present disclosure, other variations and modifications will be apparent to the skilled person. Such variations and modifications may involve equivalent and other features which are already known in the art of wireless ranging, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of estimating a time-of-arrival of a packet received by a receiver, the method comprising:
   storing a reference bit-pattern;
   receiving a plurality of samples in a samples-buffer;
   identifying, in a bit-pattern detector, a matching group of samples having a bit-pattern which matches the reference bit-pattern; and
   determining, from the matching group of samples in a correlator, a group of three correlation values, comprising a local maximum correlation value P0, an immediately preceding correlation value Pm, and an immediately succeeding correlation value Pp;
   using a polynomial function $f(\delta)$ of a difference, $\delta$, between Pm and Pp to estimate, in an estimation unit, a timing offset $T_{frac}$, between the local maximum correlation value P0 and a correlation peak; and
   estimating the time-of-arrival from a time of the local maximum correlation value P0, and $T_{frac}$.

2. The method of claim 1, wherein the polynomial function $f(\delta)$ is a cubic of the form:
   $f(\delta)=k_1 \cdot \delta + k_2 \cdot \delta^2 k_3 \cdot \delta^3$ and the coefficients $k_1$, $k_2$ and $k_3$ are dependent on the reference bit-pattern.

3. The method of claim 2, wherein the coefficients $k_1$, $k_2$ and $k_3$ are dependent on the reference bit-pattern by a vector, C, wherein $$C=[cnt_{010}, cnt_{011}, cnt_{111}]$$

wherein, applying an extended bit-pattern consisting of the reference bit-pattern both preceded and followed by a single bit of preselected polarity,
   $cnt_{010}$ is a number of bits in the extended bit-pattern having an opposite polarity to both its immediate neighbours,
   $cnt_{011}$ is a number of bits in the extended bit-pattern having an opposite polarity to just one of its immediate neighbours, and
   $cnt_{111}$ is a number of bits in the extended bit-pattern having an opposite polarity to neither of its immediate neighbours;
   wherein the coefficients relate to C through a transformation matrix $\Gamma$, having dimensions $(3 \cdot n) \times 3$ and defined through $$[k_1, k_2, k_3] = [cnt_{010}, cnt_{011}, cnt_{111}, cnt_{010}^2, cnt_{011}^2, cnt_{111}^2 \ldots cnt_{010}^n, cnt_{011}^n, cnt_{111}^n] * \Gamma.$$

4. The method of claim 3, wherein n=3.

5. The method of claim 1 further comprising determining a time-stamp, $t_{TS}$, for the time-of-arrival from a reference time, $t_D$, of the bit-pattern detection, t0, a refinement $t_{P0}$ corresponding to the difference between the reference time of the detected bit-pattern and the corresponding reference time of the local maximum correlation value, and $T_{frac}$, according to:

$$t_{TS} = t_D + t_{P0} + T_{frac}.$$

6. The method of claim 5 further comprising estimating a distance between the receiver and a transmitter from which the packet is received, based on the time-stamp.

7. The method of claim 1, wherein the received packet is modulated according to a Gaussian Frequency Shift Key (GFSK) modulation scheme.

8. The method of claim 7 wherein a bit-rate of the GFSK is 1 MHz, and the received packet is sampled at 4 MHz sampling rate.

9. The method of claim 1, wherein the receiver is a Bluetooth receiver.

10. A time-stamp module comprising:
a samples buffer;
storage circuitry configured to store a reference bit-pattern;
a bit-pattern detector comprising a relatively low-precision correlator, configured to identify a set of samples having a bit-pattern which matches the reference bit-pattern;
a relatively high-precision correlator configured to determine, from the set of samples, a group of three correlation values, comprising a local maximum correlation value P0, an immediately preceding correlation value Pm, and an immediately succeeding correlation value Pp; and
an estimation unit configured to use a polynomial function $f(\delta)$ of a difference, $\delta$, between Pm and Pp to estimate a timing offset between a timing of the local maximum correlation value P0 and a correlation peak.

11. A time-stamp module as claimed in claim 10, wherein the polynomial function $f(\delta)$ is a cubic of the form:
$f(\delta)=k_1 \cdot \delta + k_2 \cdot \delta^2 + k_3 \cdot \delta^3$ and the coefficients $k_1$, $k_2$ and $k_3$ are dependent on the reference bit-pattern.

12. A time-stamp module as claimed in claim 11 wherein the coefficients $k_1$, $k_2$ and $k_3$ are dependent on the reference bit-pattern by a vector, C, wherein $C=[cnt_{010}, cnt_{011}, cnt_{111}]$ wherein, applying an extended bit-pattern consisting of the reference bit-pattern both preceded and followed by a single bit of preselected polarity,
$cnt_{010}$ is a number of bits in the extended bit-pattern having an opposite polarity to both its immediate neighbours,
$cnt_{011}$ is a number of bits in the extended bit-pattern having an opposite polarity to just one of its immediate neighbours, and
$cnt_{111}$ is a number of bits in the extended bit-pattern having an opposite polarity to neither of its immediate neighbours,
wherein the coefficients relate to C through a transformation matrix $\Gamma$, having dimensions $(3 \cdot n) \times 3$ and defined through $[k_1, k_2, k_3] = [cnt_{010}, cnt_{011}, cnt_{111}, cnt_{010}^2, cnt_{011}^2, cnt_{111}^2 \ldots cnt_{010}^n, cnt_{011}^n, cnt_{111}^n] * \Gamma.$ 13. A time-stamp module as claimed in claim 10, wherein the time-stamp module is further configured to estimate a distance between a receiver comprising the time-stamp module and a transmitter from which a packet is received, based on the time-offset, a local time of the local maximum correlation value, and a process time.

14. A transceiver comprising the time-stamp module as claimed in claim 10, and further comprising a Gaussian Frequency Shift Key (GFSK) modulator and a GFSK demodulator coupled to the time-stamp module.

15. A transceiver as claimed in claim 14 comprising a Bluetooth transceiver.

16. A digital signal processor for a transceiver comprising:
a samples buffer;
a memory configured to store a reference bit-pattern;
a relatively low-precision correlator, configured to identify a set of samples having a bit-pattern which matches the reference bit-pattern;
a relatively high-precision correlator configured to determine, from the set of samples, a group of three correlation values, comprising a local maximum correlation value P0, an immediately preceding correlation value Pm, and an immediately succeeding correlation value Pp, and
an estimation unit configured to estimate a timing offset between a timing of the local maximum correlation value P0 and a correlation peak, using Pm and Pp.

17. A digital signal processor according to claim 16, wherein the estimation unit is configured to use a polynomial function of a difference between Pm and Pp to estimate the timing offset.

* * * * *